United States Patent
Bazydlo et al.

(10) Patent No.: US 10,252,179 B2
(45) Date of Patent: Apr. 9, 2019

(54) VERTICAL WINDING OF A SCREEN INTO A ROLL

(71) Applicant: IMAX CORPORATION, Mississauga (CA)

(72) Inventors: Waldemar Bazydlo, Mississauga (CA); Paul Kucera, Mississauga (CA); George Eric Jacques, Freelton (CA); Lionel Robert Kilburn, Toronto (CA)

(73) Assignee: IMAX CORPORATION, Mississauga, Ontario (CA)

( * ) Notice: Subject to any disclaimer, the term of this patent is extended or adjusted under 35 U.S.C. 154(b) by 452 days.

(21) Appl. No.: 14/783,422

(22) PCT Filed: Apr. 9, 2013

(86) PCT No.: PCT/IB2013/052824
§ 371 (c)(1),
(2) Date: Oct. 8, 2015

(87) PCT Pub. No.: WO2014/167380
PCT Pub. Date: Oct. 16, 2014

(65) Prior Publication Data
US 2016/0059147 A1    Mar. 3, 2016

(51) Int. Cl.
*A63J 1/02*    (2006.01)
*A63J 25/00*    (2009.01)
*G03B 21/58*    (2014.01)

(52) U.S. Cl.
CPC ............... *A63J 1/02* (2013.01); *A63J 25/00* (2013.01); *G03B 21/58* (2013.01); *A63J 2001/022* (2013.01)

(58) Field of Classification Search
CPC ........ A63J 1/02; A63J 25/00; A63J 2001/022; G03B 21/58
See application file for complete search history.

(56) References Cited

U.S. PATENT DOCUMENTS 170,288 A * 11/1875 Miller ................... A47B 41/00
312/280
278,884 A * 6/1883 Clawson ................... E06B 9/52
160/395

(Continued)

FOREIGN PATENT DOCUMENTS

JP            06222462        8/1994
WO         2007068037        6/2007

(Continued)

OTHER PUBLICATIONS

International Patent Application No. PCT/IB2013/052824, International Search Report and Written Opinion dated Dec. 11, 2013, 8 pages.

(Continued)

*Primary Examiner* — William A. Rivera
(74) *Attorney, Agent, or Firm* — Kilpatrick Townsend & Stockton LLP (57) ABSTRACT

A system for winding a screen vertically is provided. The system can include a tube and a smoothing edge feature, such as a tensioning rod. The tube can rotate about a vertical axis and draw the screen over the smoothing edge feature to cause the screen to wind up onto the tube that is positioned vertically.

27 Claims, 4 Drawing Sheets

(56) References Cited

U.S. PATENT DOCUMENTS

| | | | | |
|---|---|---|---|---|
| 1,024,089 | A * | 4/1912 | Magee | B65H 75/28 242/586 |
| 2,419,802 | A | 4/1947 | Horne | |
| 2,870,976 | A * | 1/1959 | Linquist | G03B 21/58 242/586 |
| 3,123,129 | A * | 3/1964 | Caillet | B63B 19/21 160/41 |
| 3,158,195 | A * | 11/1964 | Ney | E06B 9/54 160/26 |
| 3,701,376 | A * | 10/1972 | Froget | E06B 9/24 160/121.1 |
| 5,785,105 | A * | 7/1998 | Crider | E06B 9/13 160/243 |
| 6,176,028 | B1 * | 1/2001 | Walsh | G09F 11/21 160/121.1 |
| 7,806,160 | B2 * | 10/2010 | Byeon | E06B 9/40 160/11 |
| 7,823,306 | B1 | 11/2010 | Kersten et al. | |
| 8,955,258 | B2 | 2/2015 | Jacques et al. | |
| 9,371,688 | B2 * | 6/2016 | Cavarec | E06B 9/64 |
| 2004/0140061 | A1 * | 7/2004 | Woodward | E06B 3/302 160/92 |
| 2005/0072532 | A1 * | 4/2005 | Holden | E04F 10/0685 160/66 |
| 2008/0163988 | A1 * | 7/2008 | Hicks | E06B 9/54 160/267.1 |
| 2010/0012282 | A1 * | 1/2010 | Franklin | E06B 9/54 160/371 |
| 2011/0116048 | A1 | 5/2011 | Read et al. | |
| 2015/0252614 | A1 * | 9/2015 | Diamond | E06B 9/44 160/108 |
| 2016/0369555 | A1 * | 12/2016 | Riemelmoser | E06B 3/4609 |
| 2017/0284153 | A1 * | 10/2017 | Reiner | E06B 9/60 |

FOREIGN PATENT DOCUMENTS

| | | |
|---|---|---|
| WO | 2012034011 | 3/2012 |
| WO | 2012085252 | 6/2012 |

OTHER PUBLICATIONS

Chinese Application No. 201380074951.7, Office Action dated Jul. 29, 2016, 11 pages (5 pages for the English translation and 6 pages for the original document).

European Application No. 13881582.4, Extended European Search Report dated Nov. 21, 2016, 7 pages.

* cited by examiner

VERTICAL WINDING OF A SCREEN INTO A ROLL

CROSS REFERENCE TO RELATED APPLICATIONS

This is a U.S. national phase under 35 U.S.C. 371 of International Patent Application No. PCT/IB2013/052824, titled "Vertical Winding of a Screen Into a Roll" and filed Apr. 9, 2013, which is incorporated herein by reference in its entirety.

TECHNICAL FIELD

The present disclosure generally relates to methods and systems for winding a screen, such as a large screen for image projection, vertically into a roll.

BACKGROUND

Screen handling systems can be used for rewinding/redeploying screens. Screens that are wound up into a roll must be done in ways that do not impart irregularities to the screen surface that can be seen by a viewer when the screen is redeployed. Such irregularities can include a wrinkle or fold, a stretch mark, an indentation, or a tear. Winding of a high-gain screen can be more challenging than a flat-gain screen, as surface irregularities can be more pronounced.

As screen size increases in order of magnitude, for example from ten-feet wide to one hundred-feet wide, the screen wind-up system can become larger, heavier and involve additional challenges when transporting, handling and mounting. The installation of large cinema screens in a theatre may be a one-time process for the screen. Once installed, the screen can remain in place for decades or years. The one-time high cost of a quality screen is justifiable. In general, screens of the larger size can be permanently installed and may not be designed to be wound up for redeployment at a later time elsewhere. If rewinding the screen is needed, applying traditional screen winding methods may appear to be too limiting and not of much use. Systems and methods for winding up larger screens are generally unavailable. A need to wind up a screen in the vertical orientation can occur.

There is a need for a screen handling system that can rewind a screen and can make the screen become compact for transporting and can allow the screen to be redeployed from a compact state at another location, possibly multiple times, while ensuring the quality of the screen is preserved.

SUMMARY

In one aspect, a vertical screen winding system includes a tube and a smoothing edge feature. The tube can be positioned with respect to a vertical portion of a screen. The smoothing edge feature can be positioned parallel to the tube. The tube is rotatable about a vertical axis for drawing the screen over the smoothing edge feature and causing the screen to wind up onto the tube.

In another aspect, a screen is rolled up vertically. A tube is positioned vertically at a distance from a screen support structure. A smoothing edge feature is positioned parallel to the tube. At least part of the screen is passed over the smoothing edge feature. A side edge of the screen is connected to the tube. The screen is wound onto the tube by rotating the tube about a vertical axis and causing the screen to traverse over the smoothing edge feature that prevents a crease from forming in the screen.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

DETAILED DESCRIPTION

Figure 1:
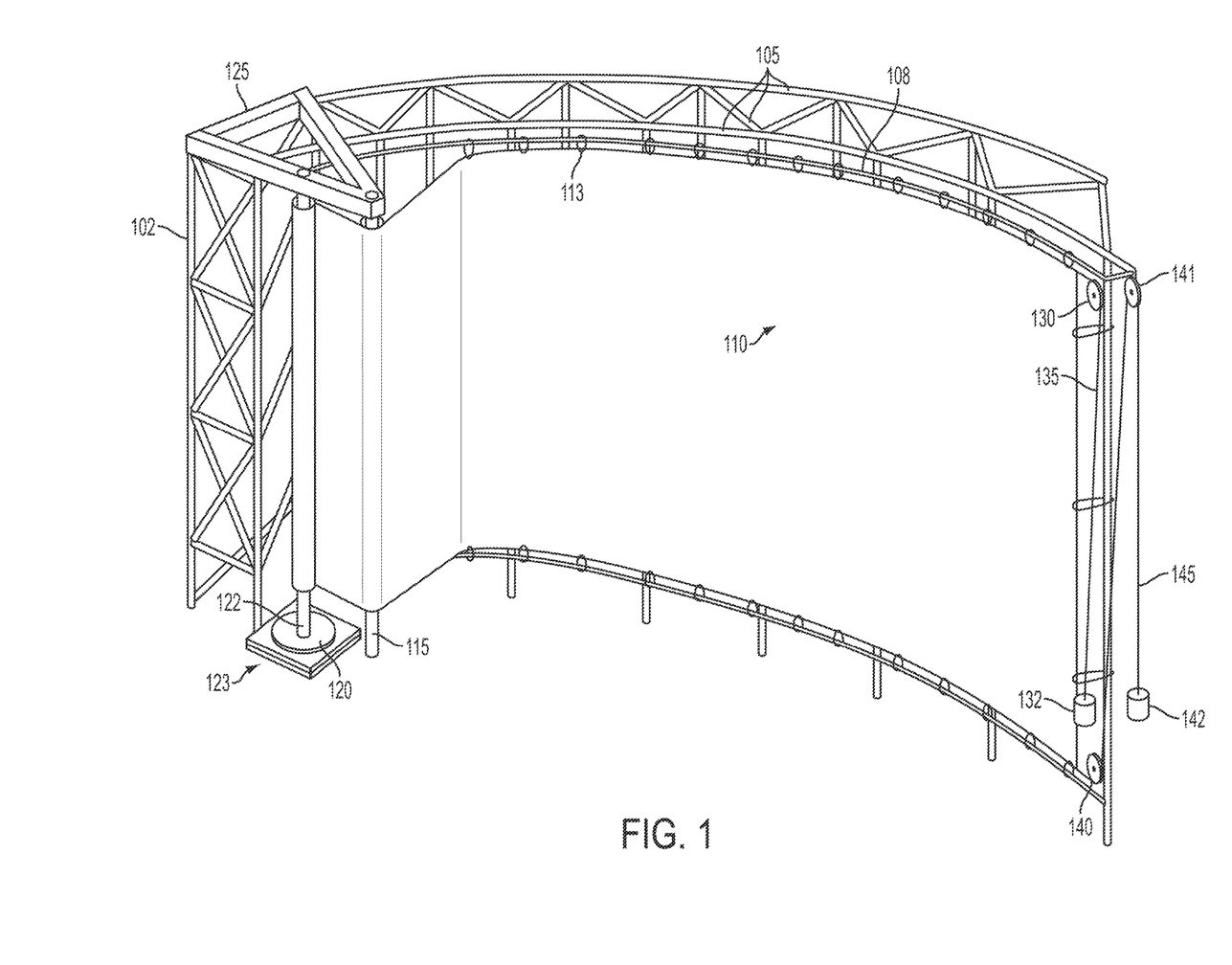
FIG. 1 depicts one example of a vertical screen wind up system.

Theatres with a large screen can have a separate support structure configured specifically to support the screen in an upright position and provide the desired screen surface profile, an example of which is shown in FIG. 1. FIG. 1 shows a screen 110 and a system for removing the screen 110 from a support structure, such as scaffold structure 102 that includes linear segments 105. The linear segments 105 can be tubular or angle iron, or any other design typically made of metal useful for scaffolding or stage type structures. The base of the scaffold structure 102 can be anchored to the ground or wall to provide further rigidity and stability to the structure.

Theatre screens can be made at a manufacturing facility that can apply a quality coating to a screen base material to obtain a high quality surface on which projected images are displayed. The manufactured screen can be rolled up onto a rigid cylindrical tube along the screen's short dimension. To ensure maximum protection of the screen's display surface, the display surface can face inward to the center of the roll. Thin foam sheets can be placed between the layers of screen as the screen is being rolled up. To allow for easier maneuvering of the rolled up screen and to minimize physical contact of the screen material, the rigid cylindrical tube can be longer than the screen dimension at both ends of the screen. The screen can be crated in a long shipping crate and sent to the theatre site for installation.

After a screen support structure has been erected into its vertical configuration and the site is relatively free of dust from theatre construction, the screen can be removed from its shipping crate for installation. Transferring the screen from the screen roll to the screen support structure can be performed by orienting the screen roll vertically such that the screen can be removed from the roll onto the vertical screen structure more easily.

Figure 2:
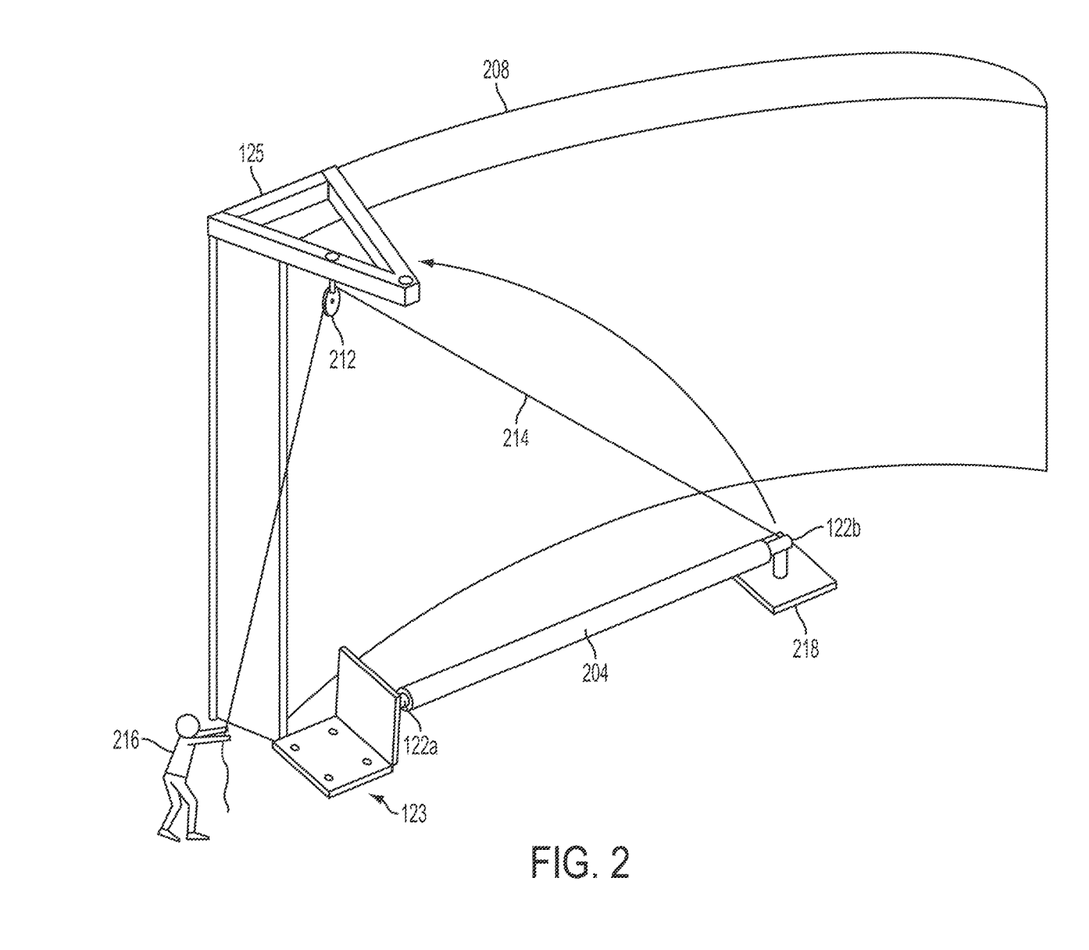
FIG. 2 depicts one example of a system for moving a screen roll of a vertical screen wind up system from a horizontal to a vertical orientation.

To transition the screen roll orientation from the horizontal position to the vertical position, a screen transition system can be used. FIG. 2 depicts a screen transition system according to one aspect. For simplicity, a screen support structure 208 is depicted without details, such as scaffolding features as in the scaffold structure 102 of FIG. 1. A rigid tube 122 is depicted as cylindrical and having a screen wound onto it to form a screen roll 204. A bottom portion 122a of the rigid tube 122 is fitted onto a bottom support assembly 123 at a location that is proximate to one side of the screen support structure 208. A top portion 122b of the rigid tube 122 can be seated on a temporary support post 218. The top portion 122b can be raised and positioned at the top of the screen support structure 208 using hardware that has been designed to facilitate the screen installation. A vertical support structure 125 can be temporarily mounted at the top of the screen support structure 208. As shown in FIG. 2, a pulley 212 mounted to the vertical support structure 125 and a line 214 attached to the top portion 122b of the rigid tube 122 can be used to raise the screen roll 204. For example, the line 214 can be used to pull up the top portion 122b of the rigid tube 122 to the vertical support structure 125. A person 216, a motor, or a manual winding mechanism can be used to pull on the line 214 to raise the top portion 122b of the rigid tube 122 to the vertical support structure 125.

The bottom portion 122a can be fitted to a bottom support assembly 123 that can allow the rigid tube 122 to pivot as it is brought into a vertical position. When the top portion 122b is secured in position by the vertical support structure 125, the screen 110 can be pulled out from the roll by allowing the rigid tube 122 to swivel about its long axis on a swivel plate 120 (FIG. 1) mounted to the bottom support assembly 123. As the screen 110 is pulled off the screen roll 204, the top edge of the screen 110 can be supported by a horizontal top rail 108 with clips 113 as shown in FIG. 1. The clips 113 can be configured to fit through eyelet holes in the screen or the clips 113 can be configured to clamp onto the screen material. The screen 110, removed from the screen roll 204 and attached to the rail, can be expanded across the top to horizontally span the screen support structure 208. Once the screen 110 has been removed from the screen roll 204, the top end of the rigid tube 122 can be released from the vertical support structure 125 and the top of the rigid tube 122 can be lowered to the floor using the pulley 212 and line 214 so that the rigid tube 122 pivots about the bottom support assembly 123. The screen 110 on the screen structure can be tensioned along its edges with the standard attachment schemes to the screen support structure 208 to achieve the final screen profile desired.

Figure 3A:
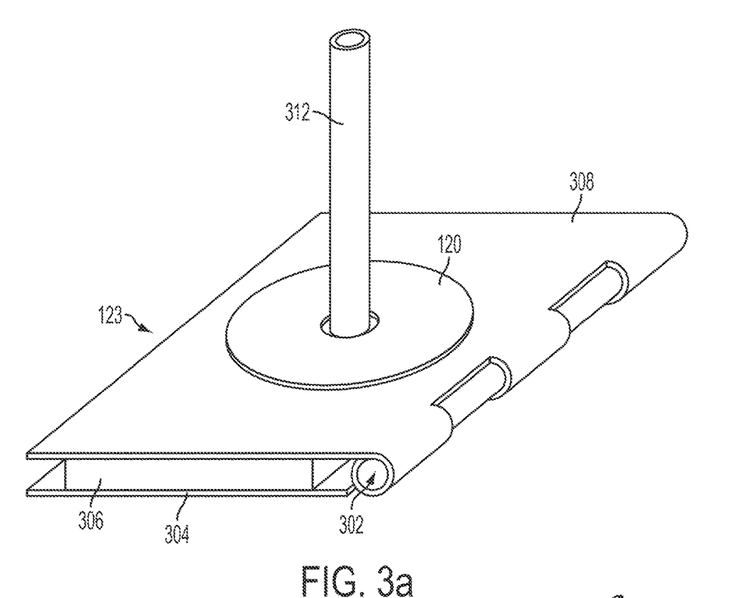
FIG. 3A depicts one example of a double hinge plate system with a pipe stud and swivel plate in a vertical support position.
Figure 3B:
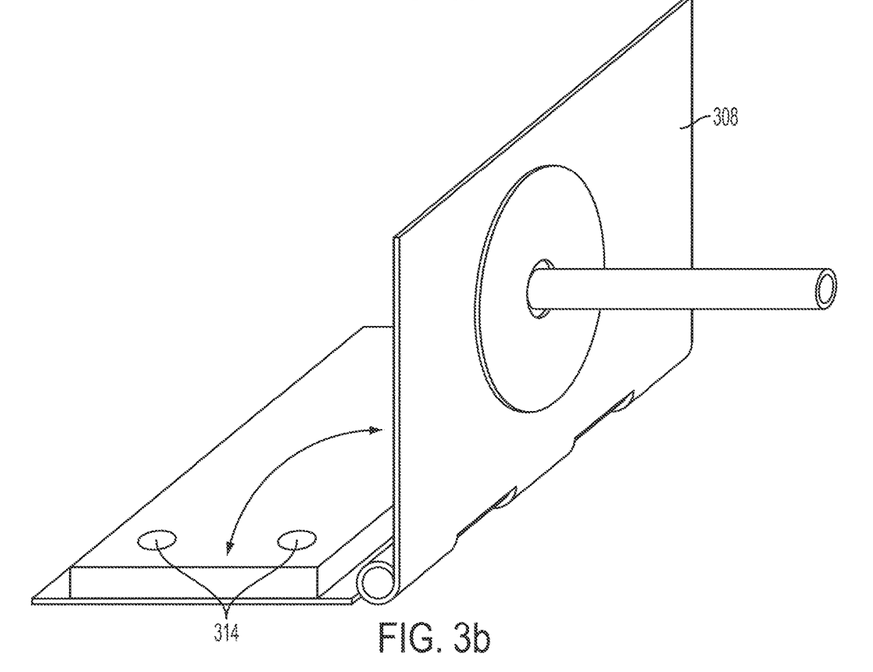
FIG. 3B depicts one example of the double hinge plate system of FIG. 3A in a non-vertical support position.

The bottom support assembly 123 can hold one end of the rigid tube 122 and can allow the rigid tube 122 to be pivoted between the horizontal and the vertical position. An example of the bottom support assembly 123 is shown in more detail in FIGS. 3a-b. There are a number of features in this assembly that can facilitate the vertical screen winding and unwinding process. The assembly includes a base hinge plate 304 and a pivot hinge plate 308. The two hinge plates are joined together with a hinge pin 302. A spacer plate 306 can provide additional stiffness to the base hinge plate 304. To mount the bottom support assembly 123 at the correct location next to a screen support structure, anchor screws can be used through the spacer plate 306 and base hinge plate mounting holes 314 to attach the base hinge plate 304 to the floor. Attached to the pivot hinge plate 308 is a stud pipe 312. The outer diameter of the stud pipe 312 can be less than the inner diameter of the rigid cylindrical tube that is to fit over the stud pipe 312. A swivel plate 120 can be mounted on the hinge plate such that the stud pipe 312 is able to protrude through the center of the swivel plate 120. The swivel plate 120 may be able to turn, while the stud pipe 312 may not be able to turn. The stud pipe 312 can be mounted to the swivel plate 120 so that it can turn with the swivel plate 120. With the screen roll in the horizontal orientation the base hinge plate 304 mounted to the floor and the pivot hinge plate 308 positioned as shown in FIG. 3b, a bottom end of a rigid tube can be inserted onto the stud pipe 312 and against the swivel plate 120. When the top portion 122b of the rigid tube 122 is raised as described previously, the pivot hinge plate 308 can move from the position shown in FIG. 3b to the position shown in FIG. 3a. When the screen roll is in the vertical position, the rigid tube with the rolled screen can rest on the swivel plate 120. The swivel plate 120 can allow the screen roll to rotate on the pivot hinge plate 308 as the screen is pulled off of the screen roll.

If the position of the screen roll is to be raised a distance from the floor to allow the screen to be properly aligned with the screen structure, a spacer can be added over the stud pipe 312 between the swivel plate 120 and the bottom of the rigid tube 122 when the screen roll is in the horizontal position.

The vertical support structure 125 can be mounted to the screen support structure 208 of FIG. 2 and can be used to anchor the pulley 212 used to raise the top of the screen roll 204 as well as providing support to the top of the screen roll 204 in the vertical position. Supporting the top of the screen roll 204 can be a accomplished in a number of ways that allows the rigid tube 122 to swivel about its axis. One approach can include using the vertical support structure 125 to hold a section of pipe with an inner diameter that is larger than the outer diameter of the rigid tube 122 that allows the rigid tube 122 to rotate within the pipe. Another approach, shown in FIG. 4 and discussed in detail below, can include using a stud pipe 412 with an outer diameter that is less than the inner diameter of the rigid tube 122 to allow the rigid tube 122 to rotate about the stud pipe 412.

After the screen is installed, the empty rigid cylinder tube can be discarded if the tube is not configured for reuse in a vertical rewind process. In situations where the manufacturer of the screen has wound the screen onto a rigid tube, the tube may not configured for a vertical rewind process and therefore the rigid tube may not be reused for a vertical rewind of the screen.

To rewind a screen vertically, a system with a number of additional features may be used. One feature can include tensioning the screen top and bottom edge horizontally from one side edge of the screen as the screen is being rewound. Working in conjunction with the tensioning system can be a vertical smoothing edge feature that can be aligned to be parallel to the vertical rigid cylindrical tube. A thin foam sheet that span the vertical length of the screen can be properly positioned using a holding system feature. A fourth feature can include a screen edge holding system when the screen is wound into a roll.

FIG. 1 shows a screen top and bottom screen edge tension system that can work from one side edge of the screen 110. The top edge of the screen 110 can be loaded under tension by a line 135 attached to one end of the top edge of the screen 110. A weight 132 and pulley 130 in combination as shown in FIG. 1 can create tension on the top edge of the screen 110. Similarly, the bottom edge of the screen 110 can be loaded under tension by a line 145 attached to one end of the bottom edge of the screen 110. A weight 142 and pulleys 140 and 141 in a configuration shown in FIG. 1 can create tension on the bottom edge of the screen 110. The vertical smoothing edge feature can be a tensioning rod 115 that extends the full vertical height of the screen 110 and the base of the tensioning rod 115 is supported to be a fixed distance from the rigid tube 122. The top of the tensioning rod 115 can be held by a bracket, such as the vertical support structure 125, that holds the top of the rod the same fixed distance from the rigid tube 122 as the bottom of the tensioning rod 115 is held from the rigid tube 122. The bottom support assembly 123 can be configured to support both the rigid tube 122 and the tensioning rod 115. The bottom support assembly and the vertical support structure 125 can work in concert to ensure the positional relationship between the rigid tube 122 and the tensioning rod 115 is maintained. The tensioning rod 115 can swivel freely along its long axis or swivel with a certain amount of drag, or the tensioning rod 115 can be fixed so it does not swivel. The top and bottom edge of the screen 110 can be attached to the rigid tube 122 by a mechanical means such as tape. Other mechanical attachment means may also include a pin or snap on button or other mechanical clamping setup that does not protrude an extensive amount to cause the layer of screen 110 that is wound over the attachments to become deformed. With the screen top and bottom edge slightly tensioned, the rigid tube 122 can be rotated along its vertical axis to cause the screen 110 to be pulled over the tensioning rod 115 and be wound onto the rigid tube 122 to create the screen roll.

The tensioning rod 115 can create a bit of tension on the screen 110 between the rigid tube 122 and the tensioning rod 115 to ensure no wrinkles form in the screen 110 as it is being wound vertically onto the rigid tube 122 or screen roll. The additional frictional drag of the screen 110 over the full length of the tensioning rod 115 can create enough tension in the full vertical length of the screen's height to prevent any loose sections of the screen 110 from forming between the rigid tube 122 and the tensioning rod 115 as the screen 110 is being wound onto the rigid tube 122 or screen roll. If loose sections of screen 110 form excess slack as the screen 110 is being wound onto the rigid tube 122 or screen roll, a fold may be formed. A fold of this nature can be damaging to the screen 110, such as by leaving a permanent fold scar that can become visible when the screen 110 is unwound and attached to the screen frame at the next location.

The tensioning rod 115 can help align the screen 110 to the rigid tube 122 as the screen 110 is wound onto the rigid tube 122. Alignment can ensure that with each full revolution onto the rigid tube 122, the new layer of screen wind is directly on top of the previous layer of screen wind. If the screen 110 winds onto the screen roll at a slight angle, the screen layers may not wind directly on top of each other and instead can create a shift with each wind layer, causing the screen 110 to take up a larger portion of the screen roll cylinder's vertical length or lead to screen folds. This can be undesirable and can cause winding problems further into the screen winding process. The tensioning rod 115 can be used to mitigate an offset wind problem.

To help further protect the screen roll during transportation, sheets of thin soft material such as foam can be inserted between the screen layers on the screen roll. This can be done during the screen winding process by properly positioning, for example, long strips of thin foam between screen layers as the screen 110 is being wound. The foam sheets may extend the full vertical length of the screen 110 to provide the additional protection for the whole screen surface. The foam may be cut into smaller widths that cover the full height of the screen 110, and can be fitted in the space between the tensioning rod 115 and the screen roll. As each section of foam is wound onto the screen roll with the screen 110, another section of foam can be positioned for winding onto the screen roll cylinder with the next portion of the screen 110. The process can be repeated until the whole screen has been wound onto the screen roll cylinder.

To ensure the soft material, such as the foam sheets, is wound into the screen roll while being aligned with the section of screen 110, additional steps can be taken that may help make the winding process easier. One additional step can be to have the foam precut to rectangle pieces that have a width similar to the spacing between the screen roll cylinder and the tensioning rod 115, and a length that is equal or slightly longer than the full height of the screen 110. Another step can be to have the foam rolled up to make it easier to get the foam sheets into the proper position. Another step can be to have a mounting system for the foam that properly holds the top edge of the foam section in a way that allows the foam to hang down with its side edge parallel to the vertical axis of the screen roll.

When the screen 110 is to be vertically wound onto the rigid tube 122, the first rolled up foam section can be brought to the top of the screen at the vertical support structure 125. The edge of the foam can be mounted into the foam holding system so that the foam roll can be allowed to unravel downwards when it is released. Before the screen winding begins, the foam sheet alignment with respect to the rigid tube 122 or the screen roll can be adjusted using the foam mounting system. When the foam mounting system has been adjusted for proper foam alignment, the foam can be tucked in with the screen 110 as the screen 110 is wound onto the screen roll cylinder. Since the foam mounting system alignment has been properly adjusted, the next roll of foam can be mounted and unraveled to allow the screen winding process to continue.

A person positioned at the bottom of the screen rolling setup can help align the foam with the screen 110, possibly taping the bottom of the foam to the bottom of the screen. As the screen 110 and foam are being wound onto the rigid cylindrical tube the person at the bottom of the screen rolling setup can also tension the bottom of the screen between the rigid tube 122 and the tensioning rod 115 such that the screen bottom edge tension line 145 may not be required.

A person positioned at the top of the screen rolling setup can also tension the top edge of the screen 110 between the rigid tube 122 and the tensioning rod 115 such that the screen top edge tension line 135 may not be required.

Figure 4:
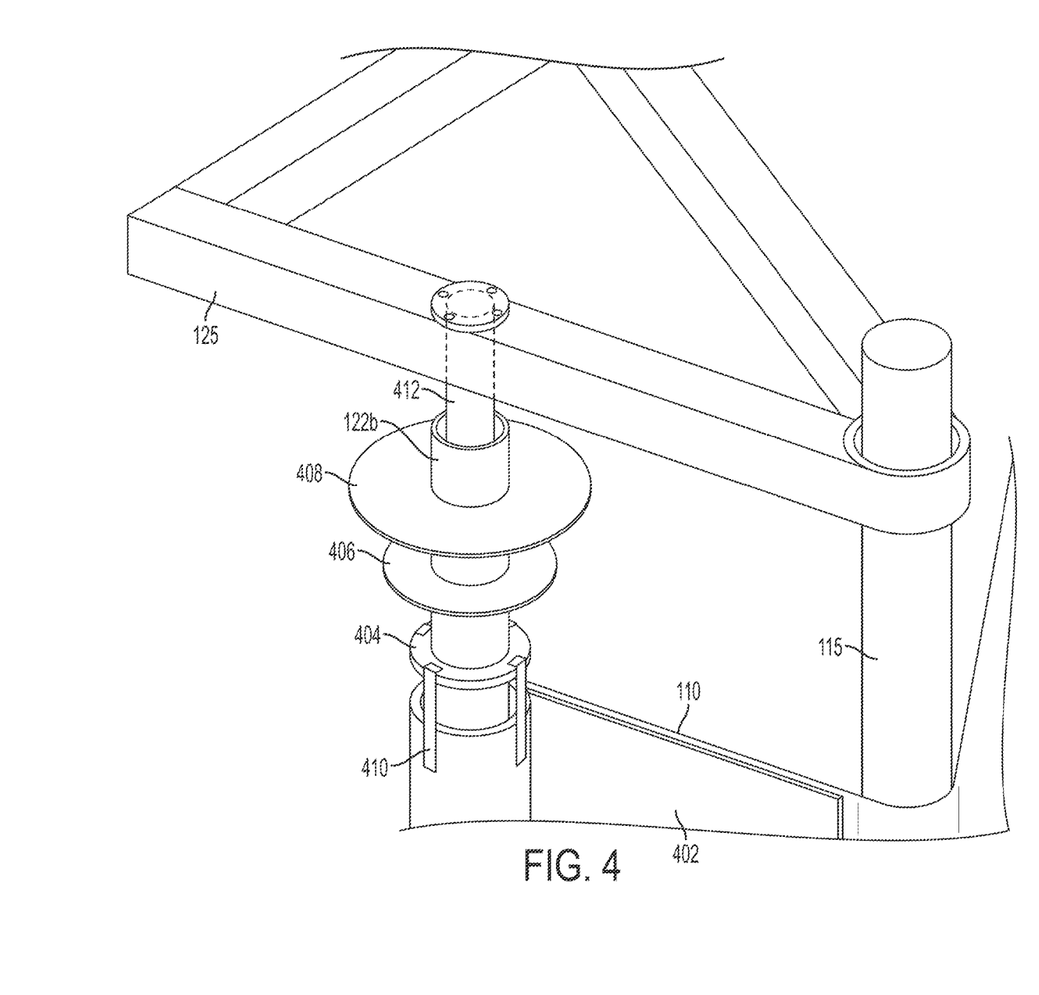
FIG. 4 depicts one example of a vertical support system for a rigid cylindrical tube with ring plates.

As the screen 110 is wound onto the screen roll, the top edge of the screen 110 can be held up by being attached to the top of the rigid tube 122. Attaching the top edge of the screen 110 to the top of the rigid tube 122 can ensure that each layer of the screen 110 being wound onto the roll aligns and remains aligned with the previous screen layer. FIG. 4 shows a mechanism that can be used to hold the top edge of the screen 110 as it is wound onto the rigid cylindrical tube or the next layer of screen 110 on the screen roll.

The screen top edge hold mechanism includes a stack of ring plates of different diameters positioned at the top portion 122b of the rigid cylindrical tube, as shown in FIG. 4. The ring plates 404, 406, 408 can slide along the top portion 122b of the rigid cylinder tube to the desired position. The first ring plate 404, the smallest diameter ring, rests on an adjustable stop ring (not shown) which can be positioned a short distance above the position of the top edge of the screen 110 as it winds onto the rigid cylindrical tube. The outer edge of the first ring plate 404 can be of a diameter that is about one inch greater than the outer diameter of the rigid cylindrical tube. Tape 410, or other specifically designed mechanical tabs, can be used to hold the top edge of the screen 110 to the first ring plate 404. The foam 402 can be placed in between the screen 110 on wind up and can be held in place by friction. As the screen 110 continues to be wound up on the roll, the roll diameter becomes larger than the outer diameter of the first ring plate 404. At this stage, a second ring plate 406 can be pushed towards the first ring plate 404 and can allow the next layers of screen to be attached to the second ring plate 406. The process of inserting more foam 402 with the screen 110 as the screen 110 is being wound onto the roll, attaching the screen top edge with tabs onto the ring plates and adding the next larger diameter ring plate as the screen and foam roll diameter increases, can continue until all of the screen 110 is wound onto the roll. Using the ring plates can provide a greater surface area to fasten multiple pieces of tape 410 as well as the ring plates having a surface that is positioned at right angles to the pulling force on the tape 410, providing a better hold. The tape 410 at the edge of the ring plates can be pulled down rather than being lifted if the tape 410 is attached to the rigid cylindrical tube. The tape 410 attached to the screen 110 can be sandwiched by the next layer of screen 110 and foam 402, and can be restricted from being lifting off of the screen 110.

Once the screen 110 has been fully wound onto the screen roll, the ring plates can be locked into place with an adjustable clamping ring (not shown), which can be placed over top of the ring plates and locked into place. The stack of ring plates can be held in place between the adjustable stop at the bottom and the clamping ring at the top. At this stage, a protective cover can be placed over the screen roll. The top portion 122b of the rigid tube 122 can be attached to a line that passes through a pulley mounted onto the vertical support structure 125. When the top portion 122b is detached from the vertical support structure 125, the cylinder can pivot about the cylinder base support structure until the screen roll reaches a horizontal orientation at floor level.

When the rigid tube with the rolled up screen is in a horizontal position, the bottom of the rigid tube can slide out from the pipe stud on the hinged plate so the screen roll assembly can crated for transport to the next location where the screen 110 is required. At the next location, the process of installing the screen onto the screen support structure from a screen roll is repeated as described above.

Having a large screen vertical rewind capability can enable auditoriums with vertical screen rewind capability to be configured for other presentations. For example, a large screen, which may be an existing screen without rewind capability, can be fitted with a vertical rewind capability to allow the screen to be vertically rewound in accordance with various aspects. Any screen support structure can be subsequently disassembled or repositioned to allow for stage performances. In this situation, the screen rewind structure shown in FIG. 1 can be configured such that elements 115, 120, 122, 123, and 125 are positioned on a separate structure from the screen structure 102, such that the separate structure can be hidden from being seen by any member in the auditorium audience and allow the screen rewinding elements to remain in place while the screen structure can be removed or repositioned. When a cinema presentation is implemented, the screen structure can be placed in position again and the screen can be redeployed in the manner described earlier.

Another example of a presentation reconfiguration can involve changing a type of screen. In this situation, one screen type may be a high-gain screen used for three-dimensional (3D) cinema presentations, while another screen type, such as a lower gain screen or a screen with a diffuse surface, can be used for a two-dimensional (2D) cinema presentation. In this situation, the screen rewind structure shown in FIG. 1 can be configured such that elements 115, 120, 122, 123, and 125 are positioned to be hidden from being seen by any member in the auditorium audience. A first screen can be configured on the screen structure for cinema presentation viewing. When a second screen, different from the first screen, is used, the second screen can be unwound from the vertical rewind assembly. When the second screen is not used for cinema presentation viewing, it can be rewound by the vertical rewind system to expose the first screen.

Although the above description has been applied to portable theatre scenarios, it would be possible to use the same techniques with theatres in which the screen was intended to be permanent. For example, a screen that has been mounted and is to come down but still has a significant amount of useful life can be rewound using the methods described above. The screen can be transferred from its mounted position to a position in which the screen can hang freely vertically from its top edge and be able to slide horizontally along its top edge to the winding setup. If the screen support structure does not have provisions for a top rail, a simple top rail can be designed to be retrofitted onto existing screen structures to facilitate the vertical wind described above.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A vertical screen winding system comprising:
   a tube for being positioned with respect to a vertical portion of a screen;
   a mechanism attached to a top edge of the screen and to the tube for coupling the screen to the tube; and
   a smoothing edge feature for being positioned parallel to the tube,
   wherein the tube is rotatable about a vertical axis for drawing the screen over the smoothing edge feature and causing the screen to wind up onto the tube.

2. The system of claim 1, wherein the tube is rotatable about the vertical axis for drawing a sheet of soft material positioned between the tube and the smoothing edge feature and for causing the sheet of soft material to wind up between winds of the screen onto the tube.

3. The system of claim 1, wherein a top portion of the tube is mountable to a screen support structure and a bottom portion of the tube is supportable by a bottom support assembly at a location that is proximate to one side of the screen support structure.

4. The system of claim 1, further comprising a vertical support structure mountable on a top portion of a screen support structure, the vertical support structure being adapted for supporting the tube in a vertical position or the smoothing edge feature in the vertical position.

5. The system of claim 4, further comprising a bottom support assembly adapted for supporting a bottom portion of the tube in a vertical position at a distance from the smoothing edge feature that corresponds to the distance by which the vertical support structure is adapted to support the tube from the smoothing edge feature.

6. The system of claim 1, further comprising a bottom support assembly adapted for supporting the tube in a vertical position or the smoothing edge feature in the vertical position.

7. The system of claim 6, wherein the bottom support assembly includes a spacer adapted to change the vertical position of the tube for rewinding the screen.

8. The system of claim 1, wherein the smoothing edge feature is a tensioning rod.

9. The system of claim 8, wherein the tensioning rod is fixed with respect to the vertical axis of the tensioning rod.

10. The system of claim 1, wherein the mechanism is a ring plate coupled at a top portion of the tube.

11. The system of claim 10, further comprising a mechanical tab for attaching the top edge of the screen to the ring plate.

12. The system of claim 10, wherein the ring plate includes a stack of ring plates of increasing diameter from the top edge of the screen.

13. The system of claim 12, wherein each ring plate of the stack of ring plates is slideable along the top portion of the tube.

14. The system of claim 10, wherein the ring plate rests on an adjustable stop ring spaced apart above the top edge of the screen.

15. The system of claim 10, wherein the ring plate is lockable in place on the tube with an adjustable clamping ring.

16. The system of claim 1, further comprising:
a horizontal top rail for a screen support structure, the horizontal top rail being attachable to the top edge of the screen and adapted for allowing movement along the horizontal top rail by the screen.

17. The system of claim 16, wherein the horizontal top rail is adapted for allowing the screen to be rewound vertically.

18. The system of claim 1, wherein the top portion of the tube is configured to support the screen as the screen is wound up onto the tube.

19. A method of rolling up a screen vertically, the method comprising:
positioning a tube vertically at a distance from a screen support structure;
attaching a top edge of the screen to a mechanism that is attached to the tube to couple the screen to the tube;
positioning a smoothing edge feature parallel to the tube;
passing at least part of the screen over the smoothing edge feature; and
winding the screen, having a side edge connected to the tube, onto the tube by rotating the tube about a vertical axis and causing the screen to traverse over the smoothing edge feature that prevents a crease from forming in the screen.

20. The method of claim 19, further comprising applying horizontal tension along the top edge of the screen.

21. The method of claim 19, further comprising inserting material between layers of the screen as the screen is wound onto the tube.

22. The method of claim 19, wherein attaching the top edge of the screen to the mechanism that is attached to the tube to couple the screen to the tube comprises attaching the top edge of the screen to a first ring plate or a second ring plate on the tube using a mechanical tab.

23. The method of claim 19, wherein winding the screen onto the tube comprises rewinding a first screen to allow a second screen to be exposed.

24. The method of claim 23, wherein the first screen displays two-dimensional presentations and the second screen displays three-dimensional presentations.

25. The method of claim 19, further comprising:
winding a first layer of screen onto the tube;
attaching the top edge of the first layer of the screen to a first ring plate using one or more mechanical tabs;
winding a second layer of screen onto the tube; and
attaching the top edge of the second layer of the screen to a second ring plate using one or more mechanical tabs.

26. The method of claim 25, further comprising:
locking the first ring plate and the second ring plate into place on the tube with an adjustable clamping ring.

27. The method of claim 25, further comprising:
sliding the first ring plate and the second ring plate along the tube.

* * * * *